United States Patent
Harben, Jr.

[15] 3,663,991
[45] May 23, 1972

[54] METHOD AND APPARATUS FOR EVISCERATING CHICKENS OR OTHER FOWL

[72] Inventor: Grover S. Harben, Jr., Gainesville, Ga.

[73] Assignee: Gainesville Machine Company, Inc., Gainesville, Ga.

[22] Filed: May 8, 1970

[21] Appl. No.: 35,672

[52] U.S. Cl. ................................................. 17/11, 17/45
[51] Int. Cl. ........................................................... A22c 21/06
[58] Field of Search ................................. 17/11, 44.1, 45

[56] References Cited

UNITED STATES PATENTS

| | | | |
|---|---|---|---|
| 3,555,593 | 1/1971 | Scheier | 17/11 |
| 2,774,101 | 12/1956 | Ograbisz | 17/11 |
| 2,975,469 | 3/1961 | Viscolosi | 17/11 |
| 3,474,492 | 10/1969 | Viscolosi | 17/45 |

*Primary Examiner*—Lucie H. Laudenslager
*Attorney*—Newton, Hopkins & Ormsby

[57] ABSTRACT

An evisceration system for removing the viscera from chickens or other fowl being conveyed in a head lowermost suspended state along a predetermined path. A special shackle for suspending the bird by its hocks is provided with a sterilized spoon-shaped viscera removal tool cooperative with structural guides positioned along the predetermined path of travel for being automatically extended into a precut hole in the abdomen of the bird and withdrawn therefrom. Devices are provided in the path of travel for maintaining a proper orientation of the bird to permit removal of all of the viscera by the spoon-like member.

12 Claims, 10 Drawing Figures

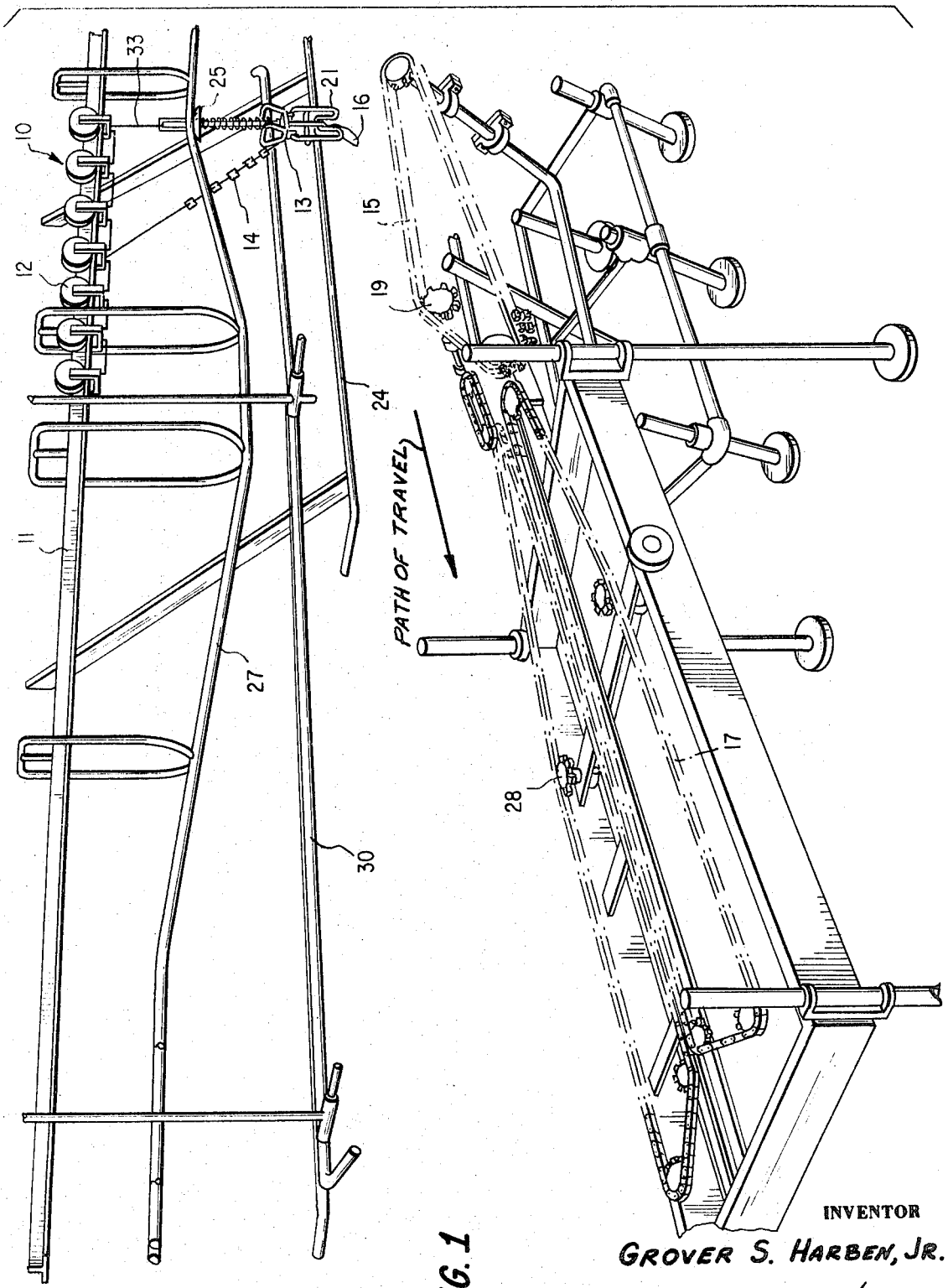

Patented May 23, 1972
3,663,991
5 Sheets-Sheet 2
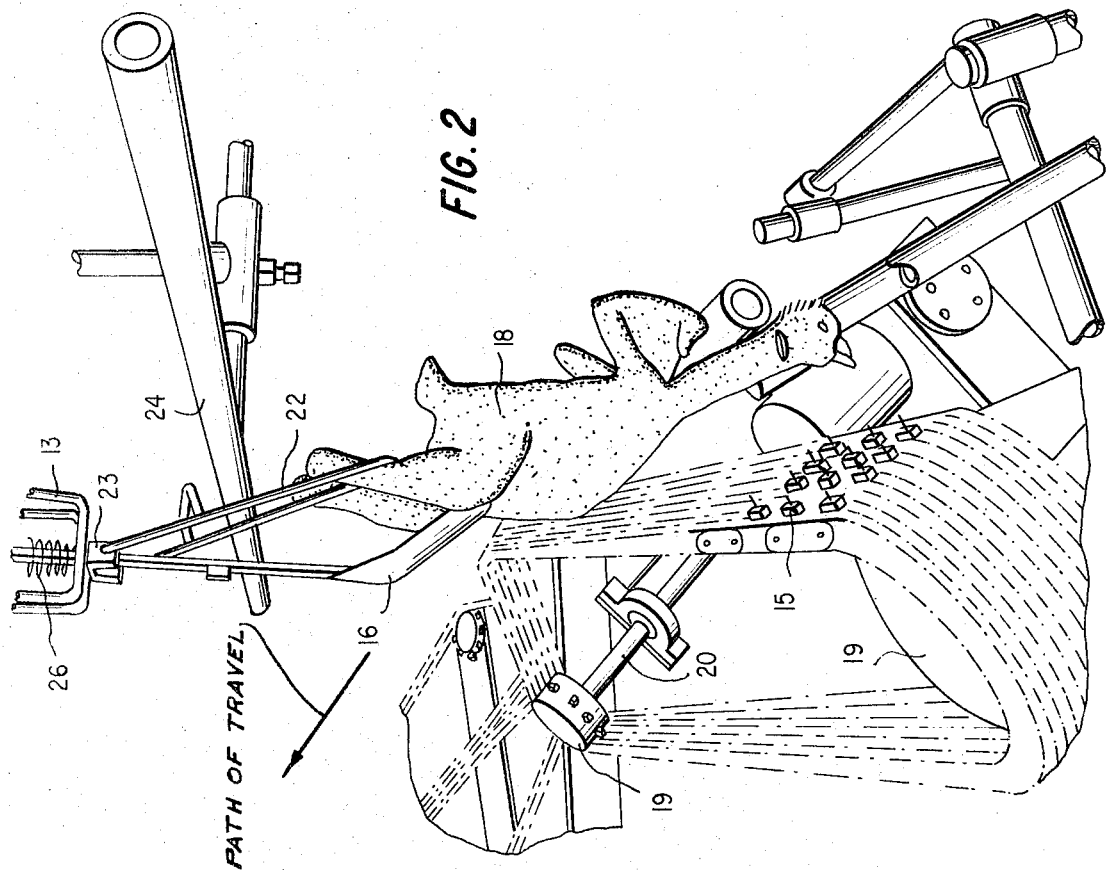
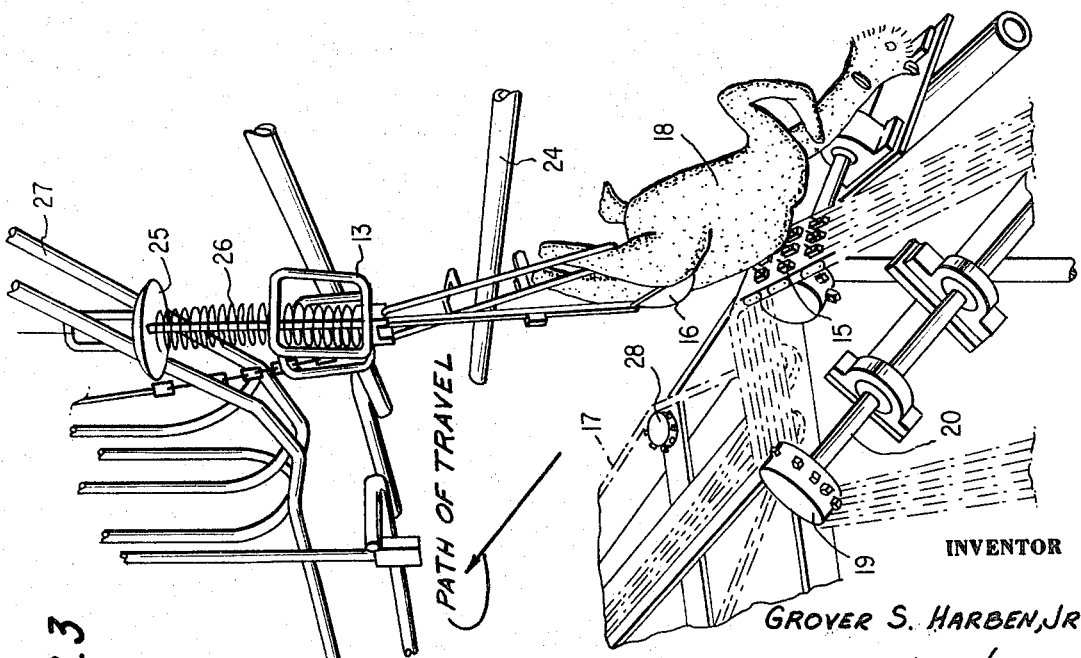
INVENTOR
GROVER S. HARBEN, JR.
BY Newton, Hopkins & Ormsby
ATTORNEYS

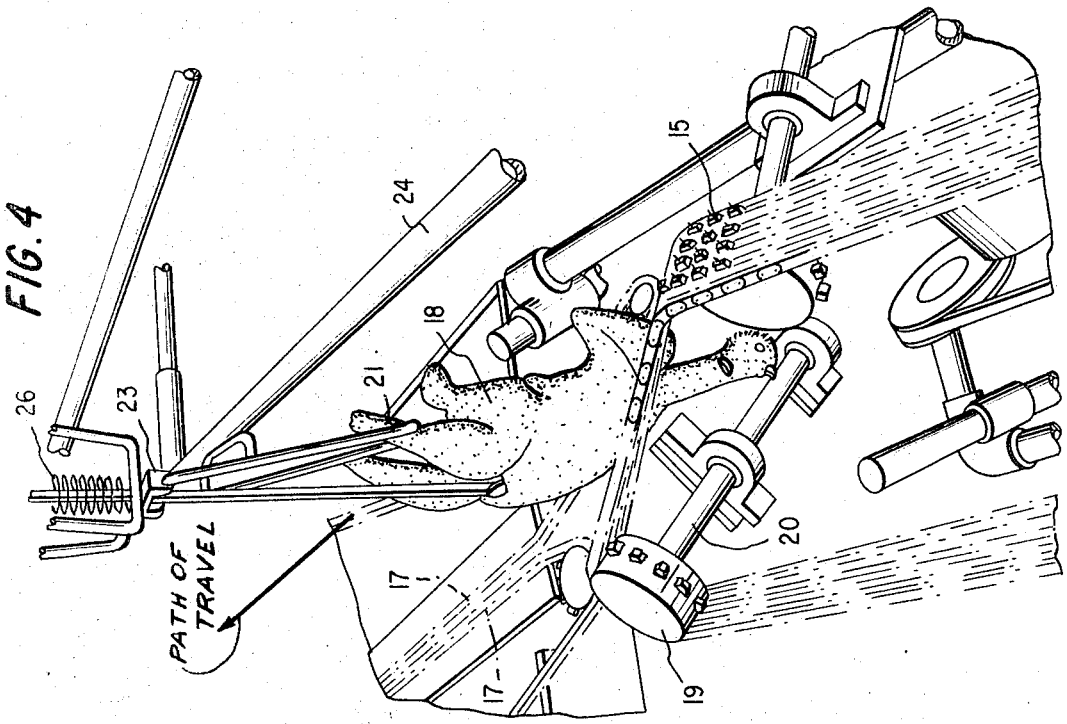
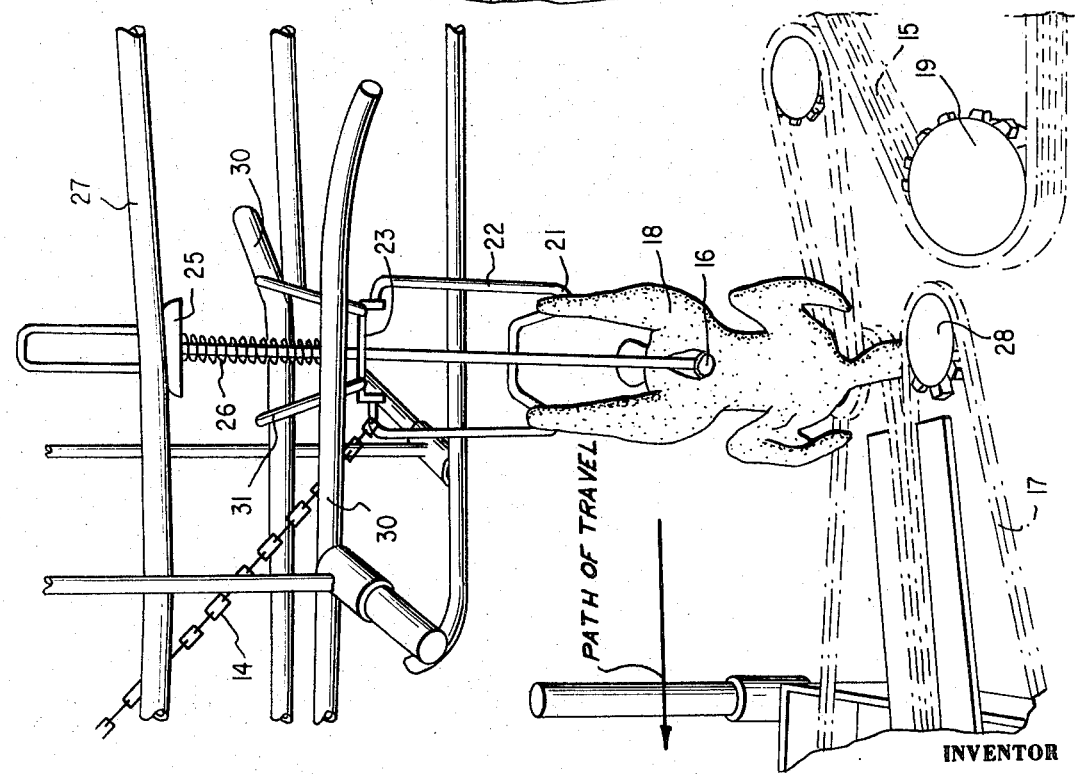

Patented May 23, 1972

PATH OF TRAVEL

INVENTOR
GROVER S. HARBEN, JR.

BY Newton, Hopkins & Ormsby

ATTORNEYS

Patented May 23, 1972

INVENTOR
GROVER S. HARBEN, JR.

BY Newton, Hopkins & Ormsby

ATTORNEYS

3,663,991

METHOD AND APPARATUS FOR EVISCERATING CHICKENS OR OTHER FOWL

BACKGROUND OF THE INVENTION

The present invention relates to the processing of poultry and more particularly to a method and apparatus for automatically removing the viscera from chickens or other fowl and exposing the viscera for inspection.

In the processing of chickens or other fowl into ready-to-cook form, the viscera must be removed with skill and care, to avoid contaminating the carcass and to prevent mutilation and loss of edible parts. Moreover, under Federal laws regulating all poultry and poultry products entering into interstate commerce, the viscera of each bird must retain their identity with the bird from which they are drawn until they have been examined by a Federal inspector. The most common method of complying with this requirement is to let the viscera hang outside the body cavity, attached to the carcass. Thus, the viscera are completely drawn and left suspended from the same side of each bird in full view of an inspector as the bird is conveyed by an inspection station in such a manner that also makes the giblets more accessible and within easy reach of a giblet trimmer for removing giblets from a bird subsequent to the inspection thereof.

Heretofore the evisceration has been performed manually by supporting the bird with one hand and inserting the fingers of the other hand through an incision in the abdomen thereof, thence loosely gripping and, with a gentle twisting motion, slipping the viscera out of the body. In addition to being a slow operation, the heart of the bird is often missed with the viscera is withdrawn by hand by the method indicated. Another drawback of the hand removal of the viscera is that the flank meat of the bird is often torn, thereby downgrading the quality of the bird. Also, whenever a diseased bird is detected by the inspector, it becomes necessary to remove not only the diseased bird from the conveyor, but all the birds subsequently touched by the person removing the viscera by hand which possibly may have been infected as a result of such subsequent contact. A delay is thus encountered at the inspection station while the birds are removed and the hands of the operator are washed or the gloves thereof changed. This delay causes a back-up in the entire processing operation which is costly to the processor both in terms of time lost and production.

SUMMARY OF THE INVENTION

Accordingly, it is an object of the present invention to provide an apparatus for automatically removing the viscera from a chicken or other fowl and exposing the viscera for inspection.

Another object of the present invention is to provide an apparatus for automatically removing the viscera from a plurality of chickens or other fowl being conveyed along a predetermined path and for exposing the viscera for inspection in which the disease of any one chicken or other fowl is not communicated to another chicken or other fowl subsequently conveyed along the predetermined path.

Still another object of this invention is to provide an apparatus for automatically withdrawing and exposing for inspection all the viscera of a chicken or other fowl.

Yet another object of this invention is to provide an improved method of withdrawing and exposing for inspection the viscera of chickens or other fowl.

A further object of this invention is to provide a method of removing and exposing the viscera of a plurality of chickens or other fowl in succession wherein the communication of disease between such chickens or other fowl is averted.

A still further object of the present invention is the provision of a method of automatically removing the viscera from a chicken or other fowl.

The foregoing and other objects are attained by the use of a spoon-like viscera removal member movably disposed on a shackle. The chicken or other fowl is suspended head lowermost from the shackle and the shackle and the bird are moved along a predetermined path by a conveyor system. Engagement of the removal member with an actuating or camming bar disposed in the predetermined path forces the removal member into an opening in the rear end of the bird and down between the viscera and the straddle and breast of the bird. Withdrawal of the spoon-like removal member is accomplished by relaxing the actuating force on a compressed spring associated with the shackle as the bird is slowly pivoted upwardly away from the back of the removal member such that the back of the bird is substantially horizontal when the removal member is completely withdrawn. This novel cooperation causes the lip of the spoon-like member to scrape along the inside of the back of the bird to forcefully bring the viscera with it as it is removed.

BRIEF DESCRIPTION OF THE DRAWINGS

Various other objects and advantages of the present invention will be readily appreciated by those skilled in the art as the same becomes better understood from the following detailed description when considered in connection with the accompanying drawings wherein like reference numerals designate like or corresponding parts throughout the several views and in which:

FIG. 1 is a perspective view of a complete eviscerating system constructed in accordance with the teachings of the present invention;

FIG. 2 is an end view in perspective of the apparatus illustrated in FIG. 1 and showing the viscera removal member being inserted into the bird;

FIG. 3 is another end view in perspective, similar to FIG. 2, and showing the bird properly oriented for receiving the viscera removal tool and illustrating the camming bar and the compression spring for moving the tool relative to the shackle and the bird;

FIG. 4 is another perspective view of the apparatus showing the removal tool fully inserted into the bird;

FIG. 5 is a side view in perspective showing the head of the bird being received between a set of endless belts having a line therebetween angularly oriented with respect to the path of travel of the bird on the illustrated conveyor system;

DESCRIPTION OF AN ILLUSTRATED EMBODIMENT

Figure 6:
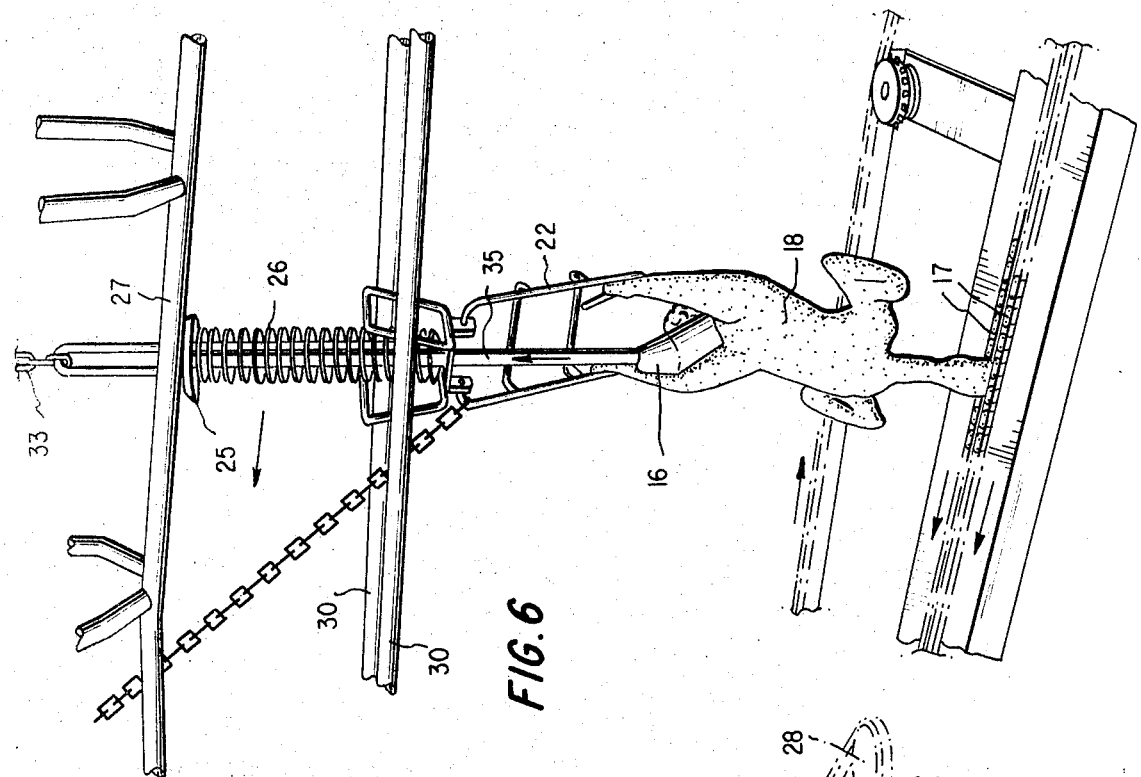
FIG. 6 is another side view in perspective showing the bird in a pivoted attitude and the viscera removal tool partially withdrawn therefrom.
Figure 7:
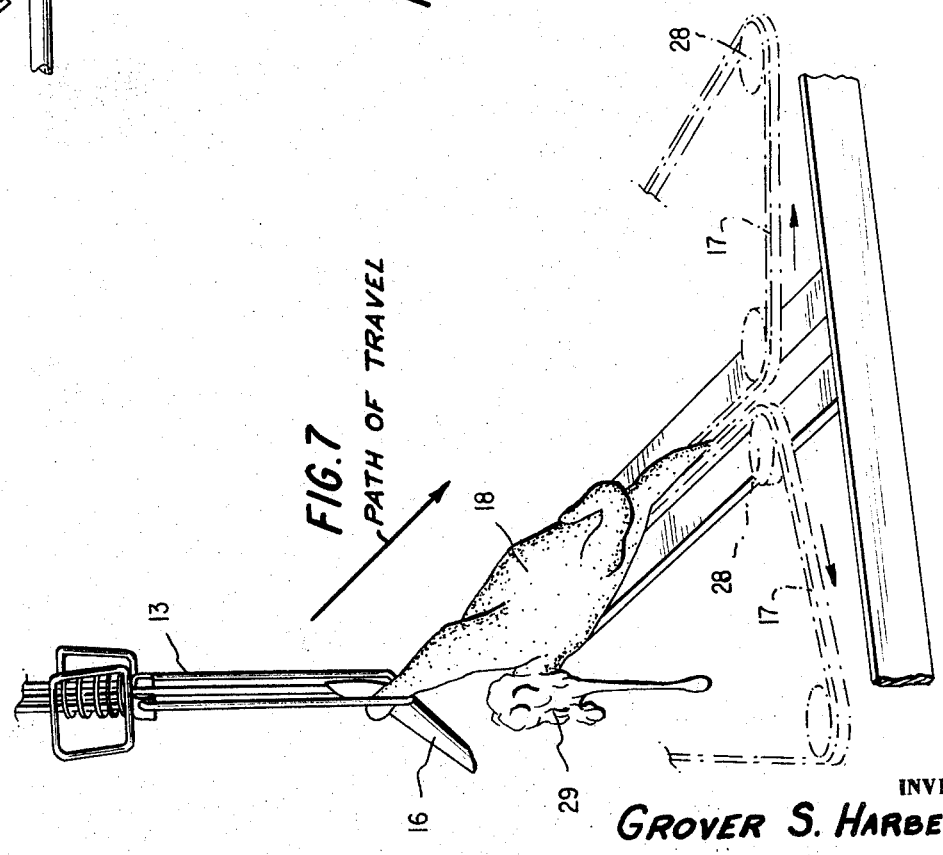
FIG. 7 is an end view in perspective showing the viscera hanging from the bird and the removal tool fully withdrawn therefrom.

Referring now to FIG. 1, there is shown an overall eviscerating system comprising a conveyor device indicated generally by the reference numeral 10 and including a longitudinally disposed channel or rail 11 defining a predetermined path of movement for a chicken or other fowl being conveyed thereby and having a plurality of wheels or rollers 12 movably positioned thereon, each of which is connected with a chicken or other fowl-bearing shackle member 13 by a chain 14 or the like for moving the shackle along the predetermined path of travel. A moving endless belt 15 is provided beneath the channel 11 for orienting the bird in a substantially vertical position during initial insertion of a sterilized viscera removal tool 16 disposed on the shackle 13, and a pair of moving endless belts 17 having portions thereof disposed in slightly spaced, parallel relationship with respect to one another are provided further along the predetermined path of travel for gripping the head portion of the bird and pivoting the bird upwardly away from the back of the removal tool 16 until the bird is substantially horizontally disposed during withdrawal of the removal tool 16.

Turning now to FIGS. 2, 3 and 4 for a more detailed description of the operative scheme of the present invention, a chicken or other fowl 18 is initially suspended by the hocks thereof from the shackle member 13 and is conveyed in a head lowermost position along the predetermined path of travel to a point where is engages the endless belt 15 driven about three sprocketed wheels 19 by a suitable motor, not shown, connected with one of the wheels 19 by a power shaft 20. The hocks of the bird 18 are gripped within a pair of U-shaped, spring-like, clamping members 21 depending from a lower end of rod extensions 22 which are pivotally connected at the other ends thereof to the shackle member 13 by a bracket 23. Pivotal movement of the rods 22 transversely of the path of travel is limited in one direction by a horizontal bar 24 disposed adjacent thereto in substantial alignment with the path of travel. With the breast of the bird 18 resting against the moving belt 15, transverse movement of the bird 18 and the rods 22 are altogether restricted, such that the bird 18 is substantially secured in a vertical position for receiving the viscera removal tool 16 in an opening precut in the rear end of the bird.

An inverted cup-shaped member 25 is movably disposed in a vertical line on the shackle member 13 and is biased upwardly by a coil spring 26 against a pair of parallel guide bars 27. The guide bars 27 are positioned in the predetermined path of movement of the shackle member 13 and, as may be best seen in FIGS. 1 and 3, follow a course therealong in which they are disposed beneath and inclined away from the channel or rail 11 of the conveyor system 10, then level off for a given distance to follow a path parallel to the channel 11, are subsequently upwardly inclined toward the channel 11, and finally exit from the eviscerating area in a path paralleling that of the channel 11.

When the shackle member 13 is conveyed along the channel 11 directly above that portion of the guide bars 27 which is downwardly inclined therefrom, the inverted cup-shaped member 25 is forceably cammed downwardly on the shackle member 13 by the parallel guide bars 27 as it is moved therealong, thereby compressing the coil spring 26 and extending the viscera removal tool 16 secured to the inverted cup-like member 25 deeply into the bird 18 between the viscera and the straddle and breast of the bird. In FIG. 4, the viscera removal tool 16 is shown fully extended into the bird 18 and it may be observed that the belt 15 now follows an angularly deviated path whereby pivoting of the bird 18 is initiated, slowly tilting the body of the bird 18 toward a substantially horizontal position wherein the breast portion thereof is disposed uppermost.

Leaving the belt 15, the bird 18 is conveyed to the area of the belts 17 driven about sprocketed wheels 28, generally four in number for each belt 17, by a suitable drive, not shown, wherein the head portion of the bird 18 is engaged between the portion of the belts 17 following a parallel path and moving in the same direction as best seen in FIGS. 5 and 6. This parallel path is angularly disposed with relation to the channel 11 defining the path of travel of the shackle member 13 such that the bird is fully pivoted in the manner described and simultaneously is pulled away from the shackle 13. Transverse movement of the shackle 13 in general as the bird 18 is pulled away therefrom is prevented by a pair of horizontally disposed, parallel bars 30 located directly beneath the guide bars 27 and between which a pair of arms 31 integrally formed on the shackle 13 are received. Pivotal movement of the rod extensions 22 in the bracket 23 is freely permitted, however, since the bracket 23 of the shackle 13 is positioned on the shackle 13 at a point lying beneath the parallel bars 30. Thus, as the shackle 13 traverses that portion of its path of travel along the channel 11 directly above the upwardly inclined section of the parallel guide bars 27, the coil spring 26 gradually returns the inverted cup-shaped member 25 to its initial position, retracting with it the removal tool 16 attached thereto. As the removal tool 16 is slowly withdrawn from the horizontally disposed bird 18, a spoon-like portion of the removal tool is dragged along the inside of the back of the bird to force the viscera 29 slowly rearwardly and out through the precut opening in the rear end thereof. The bird 18 is then carried away from the eviscerating area and from the belts 17 so that its head is no longer gripped therebetween, and it is conveyed by the system 10, suspended from the shackle 13 in a head lowermost position, with the viscera hanging over its back fully exposed to an inspector for a quick visual inspection thereof.

Figure 8:
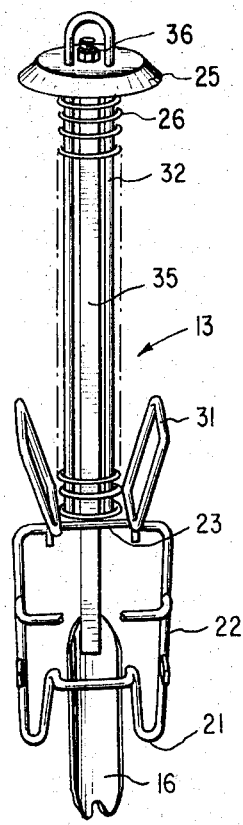
FIG. 8 is an elevational view in perspective of an eviscerating tool embodying the present invention.
Figure 9:
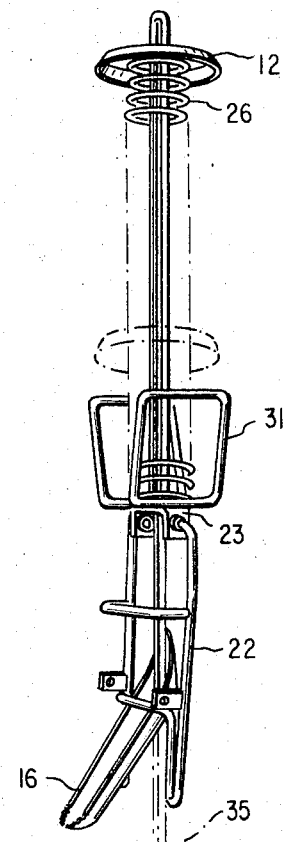
FIG. 9 is a side view in perspective of the eviscerating tool shown in FIG. 8 and illustrating in dotted lines the position of the viscera removal spoon relative to the shackle when in its fully extended position; and, FIG. 10 is another perspective showing the bird supported by a shackle with the viscera suspended therefrom and the eviscerating tool fully withdrawn.
Figure 10:
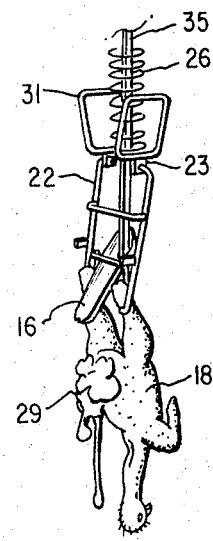

Referring now to FIGS. 8, 9 and 10 for a more detailed description of the eviscerating tool utilized in the illustrated embodiment of the present invention, the closed end of an elongated and inverted U-shaped element 32 is used to affix the shackle 13 to a roller 12 of the conveyor 10 by a line 33 secured therebetween. The arms of the element 32 pass through openings in the inverted cup-shaped member 25 and terminate at the ends thereof in the upper surface of the bracket 23. The bracket 23 is provided with an aperture for receiving an elongate arm 35, the threaded upper end of which extends through a central opening in the cup-shaped member 25 to be secured thereto by a bolt 36. Disposed between the inverted cup-shaped member 25 and the bracket 23 and circumventing the arms of the U-shaped element 32 and the elongate arm 35 is the compression or coil spring 26.

At the other end of the elongate arm 35 there is securely attached in somewhat angularly disposed relationship therewith, the substantially spoon-shaped viscera removal tool 16. In the normal, generally uncompressed state of the spring 26, the removal tool 16 is positioned, as shown in FIG. 8, between the U-shaped, hock-clamping portions 21 which may be integrally formed with the rod extensions 22 of the shackle 13. Further upward movement of the arm 35 may be limited by a stop secured thereon and engageable with the bracket 23. The ends of the rod extensions 22 are curved inwardly and may be threaded for being received in openings in the depending arms of the bracket 23 and secured therein by bolts or the like. When so connected, the rod extensions 22 and hock-clamping portions 21 thereof are pivotable within the bracket 23 such that a chicken or other fowl held therein may be movably displaced relative to the removal tool 16 in an arc perpendicular to the open face or the back of the spoon-configured tool.

The substantially rod-like arms 31, shown herein formed into a square configuration, are secured to the bracket 23 by welding or other suitable attachment means and serve, as previously indicated, to prevent lateral displacement of the shackle 13 when the shackle is disposed between the parallel bars 30 in the viscera removal tool extraction area of the disclosed system.

Thus, by camming of the inverted cup-shaped member 25 as the shackle 13 traverses the downwardly inclined guides 27, supported above such guides 27 by the base of the U-shaped element 32 and having the cup member 25 disposed therebeneath, the cup member 25 and the attached elongate arm 35 are moved downwardly against the loading of the spring 26 to thereby extend the removal tool 16. The orientation of the chicken or other fowl at this stage is such that the back of the spoon-configured tool 16 moves along the breast bone of the bird 18 with the open face of the spoon 16 facing inwardly of the cavity therein. Similarly, traversal of the upwardly inclined portion of the guide bars 27 by the bird-supporting shackle 13, thereby permitting the tool 16 to be withdrawn from the bird 18 under the expansion of the spring 26 against the inverted cup 25 and the elongate arm 35 attached thereto, is accomplished by the slow pivoting of the bird 18 on its back and gentle pulling away from the shackle 13, such that during removal of the tool 16, the open face of the spoon thereof, aided by its angular displacement with relation to the line of withdrawal, is dragged against the back of the bird 18. In this manner, the elongated spoon-configured tool 16 gathers and pulls with it the heart, liver, lungs, gizzard, and intestines comprising the viscera of the chicken or other fowl, as it is automatically withdrawn therefrom. Obviously, in the interest of preventing the spread of any disease, it is intended that the tool be sterilized before it is reused.

Briefly stated in summary, according to the present invention, a method and an apparatus for performing such method are provided for automatically withdrawing the viscera from chickens or other fowl and exposing such viscera still intact with the chicken or other fowl for visual inspection thereof.

Obviously, many modifications and variations of the present invention are possible in the light of the above teachings. It is therefore to be understood that within the scope of the appended claims, the invention may be practiced otherwise than as specifically described.

What is claimed as new and desired to be secured by Letters Patent of the United States is:

1. Apparatus for removing the viscera from chickens or other fowl and exposing the viscera for inspection, comprising
   means for conveying a chicken or other fowl suspended head lowermost along a predetermined path;
   a viscera removal tool associated with said conveying means;
   means for automatically inserting said tool into the abdomen of said chicken or other fowl at a predetermined point in said path;
   means for automatically pivoting said chicken or other fowl upward and away from said tool; and,
   means for withdrawing said tool from said chicken or other fowl while said chicken or other fowl is pivoted by said pivoting means.

2. Apparatus as set forth in claim 1, wherein said conveying means comprises a shackle for supporting said chicken or other fowl in a head lowermost condition; and,
   said tool is movably disposed on said shackle.

3. A device for supporting a chicken or other fowl in a head lowermost position and for removing the viscera therefrom, comprising:
   an elongate vertically disposed element;
   an upper end member movably disposed in a vertical line on said elongate element;
   a lower fixed end member on said element;
   resilient means disposed between said upper and lower end members normally maintaining said movable end member in an elevated position on said elongate element;
   a spoon-shaped viscera removal tool;
   an elongate arm fixed at one end to said movable end member and at the other end to said tool; and,
   means pivotally mounted on said lower end member for securably receiving the hocks of a chicken or other fowl.

4. A method of eviscerating a chicken or other fowl comprising:
   transporting said chicken or other fowl along a predetermined path suspended in a head lowermost position;
   inserting a viscera removal tool into said chicken or other fowl between the viscera and the breast bone thereof;
   pivoting said chicken or other fowl upwardly and away from the side of the removal tool adjacent said breast bone; and,
   withdrawing said tool by dragging it against the back of said chicken or other fowl while so pivoted.

5. A method according to claim 4, wherein said inserting, pivoting and withdrawing steps are automatically performed responsive to transportation of said chicken or other fowl past predetermined points in said path.

6. A method according to claim 4, wherein said tool is moved in a straight line during insertion thereof into said chicken or other fowl; and,
   said tool is moved in a straight line parallel to said first straight line during withdrawal thereof from said chicken or other fowl;
   said insertion, pivotal, and withdrawing steps being actuated in response to movement of said chicken or other fowl past given points in said predetermined path of transportation.

7. Apparatus for removing the viscera from chickens or other fowl comprising: means for conveying a chicken or other fowl suspended head lowermost along a predetermined path; a viscera removal tool associated with said conveying means; means for automatically inserting said tool into the abdomen of said chicken or other fowl at a predetermined point in said path; means for automatically pivoting said chicken or other fowl upward and away from said tool; and, means for withdrawing said tool from said chicken or other fowl while said chicken or other fowl is pivoted by said pivoting means; said conveying means including a shackle for supporting said chicken or other fowl in a head lowermost condition and having an elongate uprightly disposed element, said tool being movably disposed for movement up and down said elongate element; a lower fixed end member on said element; resilient means disposed between said upper and lower end members normally maintaining said movable end member in an elevated position on said elongate element; and an elongate arm fixed at one end to said upper end member and at the other end to said tool; whereby movement of the upper end member in opposition to said resilient means extends said elongate arm and said tool attached thereto downward relative to said elongate element and said fixed end member.

8. Apparatus as set forth in claim 7 wherein said resilient means is a spring.

9. Apparatus as set forth in claim 8 wherein said automatic tool insertion means comprises means disposed in said path of travel of said shackle for contacting said upper member as said shackle approaches said predetermined point and compressing said spring to thereby extend said tool.

10. Apparatus as set forth in claim 8, further comprising a pair of elongate bars aligned with said path and disposed such that said upper end member of said shackle is positioned therebeneath and biased against said bars by said spring, said bars being inclined downwardly of the path of travel of said shackle in one part of the path for causing compression of said spring as said shackle traverses said path for inserting said tool into said chicken or other fowl; and, said bars being inclined upwardly relative to the path of travel of said shackle in another part of said path for permitting expansion of said spring as said shackle traverses said other part of said path for withdrawing said tool from said chicken or other fowl.

11. Apparatus as set forth in claim 9 wherein said shackle further comprises means pivotally secured to said lower fixed end member for securably receiving the neck of a chicken or other fowl.

12. Apparatus as set forth in claim 11 further comprising movable means disposed beneath said path of travel of said shackle and angularly displaced relative thereto for gripping the head portion of said chicken or other fowl during the traverse of said path by said shackle and said chicken or other fowl suspended therefrom.

* * * * *